(12) United States Patent
Kretz et al.

(10) Patent No.: US 7,882,435 B2
(45) Date of Patent: Feb. 1, 2011

(54) ELECTRONIC EQUIPMENT WITH SHUFFLE OPERATION

(75) Inventors: Martin Hans Kretz, Lund (SE); Tom George Rudolf Gajdos, Dalby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 218 days.

(21) Appl. No.: 11/312,259

(22) Filed: Dec. 20, 2005

(65) Prior Publication Data

US 2007/0156679 A1 Jul. 5, 2007

(51) Int. Cl.
*G06F 3/00* (2006.01)

(52) U.S. Cl. .................. 715/716; 715/727; 707/752; 707/756; 700/94

(58) Field of Classification Search .......... 715/716, 715/727; 707/6, 752, 756; 700/94
See application file for complete search history.

(56) References Cited

U.S. PATENT DOCUMENTS

| | | | |
|---|---|---|---|
| 5,226,091 A | 7/1993 | Howell et al. | |
| 5,408,448 A | 4/1995 | Carman | |
| 6,157,731 A | 12/2000 | Hu et al. | |
| 6,188,392 B1 | 2/2001 | O'Connor et al. | |
| 6,340,957 B1 * | 1/2002 | Adler et al. | 345/1.3 |
| 6,351,634 B1 | 2/2002 | Shin | |
| 6,369,794 B1 | 4/2002 | Sakurai et al. | |
| 6,567,101 B1 | 5/2003 | Thomas | |
| 6,567,351 B1 | 5/2003 | Landsvogt | |
| 6,707,768 B2 | 3/2004 | Schilling, Jr. et al. | |
| 6,861,946 B2 * | 3/2005 | Verplaetse et al. | 340/407.2 |
| 6,947,728 B2 | 9/2005 | Tagawa et al. | |
| 6,985,134 B2 * | 1/2006 | Suprun et al. | 345/163 |
| 6,985,643 B1 | 1/2006 | Fahraeus et al. | |
| 7,054,487 B2 | 5/2006 | Ericson et al. | |
| 7,061,469 B2 * | 6/2006 | Suprun et al. | 345/158 |
| 7,152,014 B2 * | 12/2006 | Bang et al. | 702/141 |

(Continued)

FOREIGN PATENT DOCUMENTS

CN 101 203 821 6/2008

(Continued)

OTHER PUBLICATIONS

Louis Rosenberg, "A Shake-Based Media Player User Interface," U.S. Appl. No. 60/739,313, Nov. 23, 2005.*

(Continued)

*Primary Examiner*—Weilun Lo
*Assistant Examiner*—Eric Wiener
(74) *Attorney, Agent, or Firm*—Renner, Otto, Boisselle & Sklar, LLP (57) ABSTRACT

An electronic equipment is provided that includes access to a playlist, the content of which identifies a plurality of media objects, and a media player section configured to play the plurality of media objects identified in the playlist in an order. In addition, the electronic equipment includes a shuffler section for altering at least one of the order in which the plurality of media objects in the playlist are played by the media player, or the content of the playlist, in response to a shuffle command. The electronic equipment further includes a motion sensor that detects motion of the electronic equipment, the motion sensor producing an output based on detected motion from which the shuffle command is derived.

1 Claim, 9 Drawing Sheets

U.S. PATENT DOCUMENTS

| | | | |
|---|---|---|---|
| 7,184,020 B2 * | 2/2007 | Matsui | 345/156 |
| 7,215,319 B2 * | 5/2007 | Kamijo et al. | 345/156 |
| 7,230,605 B2 * | 6/2007 | Rekimoto et al. | 345/158 |
| 7,271,795 B2 * | 9/2007 | Bradski | 345/158 |
| D610,126 S | 2/2010 | Bartley | |
| 2002/0143489 A1 | 10/2002 | Orchard | |
| 2003/0021311 A1 | 1/2003 | Tsunetomo et al. | |
| 2003/0021411 A1 | 1/2003 | Seroussi et al. | |
| 2003/0236582 A1 | 12/2003 | Zamir et al. | |
| 2004/0181703 A1 | 9/2004 | Lilja et al. | |
| 2005/0114374 A1 | 5/2005 | Juszkiewicz et al. | |
| 2005/0154798 A1 | 7/2005 | Nurmi | |
| 2005/0212767 A1 | 9/2005 | Marvit et al. | |
| 2005/0212911 A1 | 9/2005 | Marvit et al. | |
| 2005/0249080 A1 * | 11/2005 | Foote et al. | 369/59.1 |
| 2006/0107213 A1 | 5/2006 | Kumar et al. | |
| 2006/0153040 A1 | 7/2006 | Girish et al. | |
| 2006/0167576 A1 * | 7/2006 | Rosenberg | 700/94 |
| 2006/0167943 A1 * | 7/2006 | Rosenberg | 707/104.1 |
| 2006/0197753 A1 * | 9/2006 | Hotelling | 345/173 |
| 2006/0243120 A1 | 11/2006 | Takai et al. | |
| 2007/0015457 A1 | 1/2007 | Krampf et al. | |
| 2007/0118241 A1 * | 5/2007 | Rosenberg | 700/94 |
| 2007/0125852 A1 * | 6/2007 | Rosenberg | 235/435 |
| 2008/0088602 A1 * | 4/2008 | Hotelling | 345/173 |

FOREIGN PATENT DOCUMENTS

| | | |
|---|---|---|
| EP | 1 705 588 A1 | 9/2006 |
| GB | 2 419 433 | 4/2006 |
| WO | 2005/109847 | 11/2005 |
| WO | 2006/094308 | 3/2006 |
| WO | 2006/037786 | 4/2006 |

OTHER PUBLICATIONS

"Multi-functional Hand-held Device," Specification, U.S. Appl. No. 60/658,777, Steve Hotelling, Mar. 4, 2005.*

International Search Report for corresponding Application No. PCT/IB2006/001593 mailed Sep. 26, 2006.

International Search Report for International Application No. PCT/IB2007/000120, dated May 22, 2007.

International Search Report and Written Opinion for PCT/US2007/003640, dated Aug. 8, 2007.

Written Opinion of the International Searching Authority, corresponding to PCT/IB2006/001593, mailed on Sep. 26, 2006.

International Preliminary Report on Patentability, corresponding to PCT/IB2006/001593, date of completion Apr. 17, 2008.

Office action mailed Apr. 29, 2009 in U.S. Appl. No. 11/458,410, filed Jul. 19, 2006.

U.S. Appl. No. 11/458,410, filed Jul. 19, 2006, corresponding U.S. published patent application No. 2008-0030456A1 is submitted here.

* cited by examiner

ELECTRONIC EQUIPMENT WITH SHUFFLE OPERATION

TECHNICAL FIELD OF THE INVENTION

The present invention relates generally to electronic equipment, and more particularly to electronic equipment with shuffle operation such as media playback in shuffle mode.

DESCRIPTION OF THE RELATED ART

The shuffle feature is a well known function of media playback equipment wherein the order in which media objects (e.g., audio tracks) on a prerecorded media are played back randomized. The shuffle feature can add variety and unpredictability to a listening experience.

Playlists are also a well known feature of media playback equipment. Playlists define a group of media objects (e.g., songs, videos, still pictures, etc.) set forth in some predetermined order. Media playback equipment refer to a selected playlist to determine the particular media objects which are to be played and the order in which they are to be played. Playlists can be created by a user, generated automatically, downloaded by the user, etc., or various combinations thereof. The playlists may include only a subset of all the media objects stored in the media playback equipment (commonly referred to as the "media library"), or may include all of the media objects within the library. In the absence of a preselected playlist, media playback equipment typically reverts to a default playlist including all of the media objects within the library in the order in which the media objects are stored in memory of the media playback equipment.

Playlists are useful in that they provide users with more control over the particular media objects which are played during a session, as well as the particular order in which the media objects are played. Sometimes it is content of the playlist that a user is particularly interested in (e.g., all classic rock songs within a media library), with less importance on the particular order in which the media objects within the playlist are played. At other times, a user may be more interested in maintaining the order of playback of the media objects within a given playlist. For example, a user may prefer to listen to the songs from a "story album" such as Pink Floyd's "The Wall" in their original order.

Depending on the user's mood, feelings, etc., there will be times-when a user desires that the media playback equipment play back the items in a playlist in the order in which they are listed. On the other hand, there will be times when a user may desire "shuffle" mode in which the items in the playlist are played back in randomized order. Still further, there may be times when a user desires that some media objects within the playlist be shuffled, but not all.

Conventional media playback equipment allows a user to select shuffle mode by either turning a shuffle feature on or off. This is typically done via a graphical user interface with which the user, by pressing appropriate buttons, etc., either activates or deactivates the shuffle feature. However, navigating through the appropriate user interface screens to turn the shuffle feature on or off can be bothersome and time consuming. Moreover, navigating through the user interface screens during playback itself can be disruptive to the listening and/or viewing experience of the user, thereby detracting from the overall entertainment experience. Thus, most users choose to either turn the shuffle feature on or off at the beginning of a playback session, and the feature remains on or off for the duration of the session. This too can detract from the overall entertainment experience.

Still further, users typically are not able to control the extent to which the items in a playlist are shuffled or randomized when the shuffle feature is active. For example, at times a user may desire to shuffle the order of only those songs in a playlist that are in close proximity to a current song being played. At other times, the user may wish to shuffle the order of all the songs in a playlist. Conventional media playback equipment does not provide such flexibility.

SUMMARY

In view of the aforementioned shortcomings associated with conventional media playback equipment, there is a strong need in the art for electronic equipment with media playback that do not suffer from such drawbacks. More particularly, there is a strong need in the art for electronic equipment that allows a user to engage a shuffle feature without bothersome and time consuming navigation. Moreover, there is a strong need in the art for electronic equipment that enables a user to engage a shuffle feature easily even during listening and/or viewing without detracting from the user's entertainment experience. Still further, there is a strong need in the art for electronic equipment that provides a user some degree of control as to the extent which the items in a playlist are shuffled or randomized.

According to the present invention, an electronic equipment is provided. The electronic equipment includes access to a playlist, the content of which identifies a plurality of media objects, and a media player section configured to play the plurality of media objects identified in the playlist in an order. In addition, the electronic equipment includes a shuffler section for altering at least one of the order in which the plurality of media objects in the playlist are played by the media player, or the content of the playlist, in response to a shuffle command. The electronic equipment further includes a motion sensor that detects motion of the electronic equipment, the motion sensor producing an output based on detected motion from which the shuffle command is derived.

In accordance with one particular aspect, the shuffler section alters the order in which the media objects identified in the playlist are played by the media player section in response to the shuffle command.

According to another aspect, the shuffler section alters the order which the media objects are played primarily in a local area of a media object within the playlist which is being played at a time when the shuffle command is issued.

According to yet another aspect, the shuffler section alters the order using a pseudo-random generator.

In accordance with still another aspect, the shuffler section alters the order primarily throughout the entire playlist.

In another aspect, the shuffler section alters the order using a pseudo-random generator.

Another aspect of the invention relates to the shuffler section altering the order by causing the media player to jump to a media object within the playlist other than the media object which is being played at a time when the shuffle command signal is issued.

According to another aspect, the shuffler section alters the content of the playlist in response to the shuffle command signal.

With yet another aspect, the electronic apparatus includes a library of media objects, the plurality of media objects identified in the playlist represent a subset of the media objects within the library, and the shuffler section alters the content of the playlist by at least one of adding additional media objects from the library to the playlist, or substituting additional media objects from the library for all or part of the plurality of media objects already identified in the playlist.

In accordance with still another aspect, the shuffle command signal is operational to identify different degrees of motion detected by the motion sensor, the different degrees being operative to cause the shuffler section to perform corresponding different degrees of altering.

According to another aspect, the different degrees of motion detected by the motion sensor pertain to the electronic equipment being shaken for a relatively short time versus a relatively long time.

According to yet another aspect, the different degrees of motion detected by the motion sensor pertain to the electronic equipment being shaken relatively softly versus relatively aggressively.

In accordance with still another aspect, in response to the shuffle command signal identifying a first degree of motion the shuffler section alters the order which the media objects are played primarily in a local area of a media object within the playlist which is being played at a time when the shuffle command is issued, and in response to the shuffle command signal identifying a second degree of motion the shuffler section alters the order primarily throughout the entire playlist.

In yet another aspect of the invention, in response to the shuffle command signal identifying a first degree of motion the shuffler section alters the content of the playlist to a relatively small extent, and in response to the shuffle command signal identifying a second degree of motion the shuffler section alters the content of the playlist to a relatively large extent.

According to still another aspect, the media objects comprise at least audio files.

According to yet another aspect, the media objects comprise at least video files.

In accordance with still another aspect, the media objects comprise at least image files.

According to another aspect, the electronic equipment is a mobile phone.

According to still another aspect, the electronic equipment is a portable personal entertainment device.

According to yet another aspect, the motion sensor is located remote from a main housing of the electronic equipment.

In accordance with another aspect, the playlist is located remote from the electronic equipment.

According to still another aspect, the plurality of media objects are located remote from the electronic equipment.

In yet another aspect of the invention, a method of reproducing media objects in an electronic equipment is provided. The method includes the steps of providing a playlist, the content of which identifies a plurality of media objects; playing the plurality of media objects identified in the playlist in an order; detecting motion of the electronic equipment; and altering at least one of the order in which the plurality of media objects in the playlist are played by the media player, or the content of the playlist, in response to detecting the motion.

In still another aspect of the invention, a program stored on a machine readable medium is provided. The program, when executed by a machine, provides for reproducing media objects in an electronic equipment by providing a playlist, the content of which identifies a plurality of media objects; playing the plurality of media objects identified in the playlist in an order; detecting motion of the electronic equipment; and altering at least one of the order in which the plurality of media objects in the playlist are played by the media player, or the content of the playlist, in response to detecting the motion.

According to another aspect of the invention, an electronic equipment is provided that includes an assemblage of objects represented in electronic form, and a shuffler section for altering at least one of the order or content of the assemblage of objects, in response to a shuffle command. In addition, the electronic equipment includes a motion sensor that detects motion of the electronic equipment, the motion sensor producing an output based on detected motion from which the shuffle command is derived.

According to still another aspect, the assemblage of objects includes a list of objects, and the shuffler section alters the order of the objects in the list in response to the shuffle command.

In accordance with still another aspect, the assemblage of objects includes a list of objects, and the shuffler section alters which objects are in the list in response to the shuffle command.

In accordance with still another aspect, the assemblage of objects represent a current theme setting for a user interface included in the electronic equipment, and the shuffler section alters which objects make up the current theme setting in response to the shuffle command.

According to another aspect, wherein the assemblage of objects includes at least one of colors, fonts, icons or sounds.

According to still another aspect, the assemblage of objects are represented as game items on a display included in the electronic equipment.

According to another aspect, the game items are playing cards.

In accordance with another aspect, the electronic equipment is a mobile phone.

According to yet another aspect, the electronic equipment is a media player, and the assemblage of objects represent criteria by which the media player forms a playlist.

According to another aspect, the electronic equipment is a media player, and the assemblage of objects represent individual playlists which make up an overall playlist.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

The present invention will now be described with reference to the drawings, wherein like reference numerals are used to refer to like elements throughout.

The term "electronic equipment" as referred to herein includes personal portable electronics, including, but not limited to, media players of various formats such as digital music players (e.g., CD, MP3, AC-3, .wma, etc.), video players (e.g., DVD, MPEG, .wmv, etc.), picture players (e.g., JPEG, etc.). Electronic equipment includes traditional media players such as CD and DVD players, as well as the increasingly popular "flash memory" and "hard drive" type media players, referring to the type of memory used to store various media files. Electronic equipment includes dedicated media players as well as multi-functional devices that include media players. Such multi-functional devices include portable radio communication equipment. The term "portable radio communication equipment", also referred to herein as a "mobile radio terminal", includes all equipment such as mobile phones, pagers, communicators, e.g., electronic organizers, personal digital assistants (PDAs), smartphones or the like. In the present application, the invention is described primarily in the context of a mobile phone. However, it will be appreciated that the invention is not intended to be limited to a mobile phone and can be any type of electronic equipment. Moreover, although the invention is described primarily in the context of shuffling media objects in a media player, it will be appreciated that the invention more generally has application in the shuffling of any types of lists or collections as will also be discussed herein.

Figure 1:
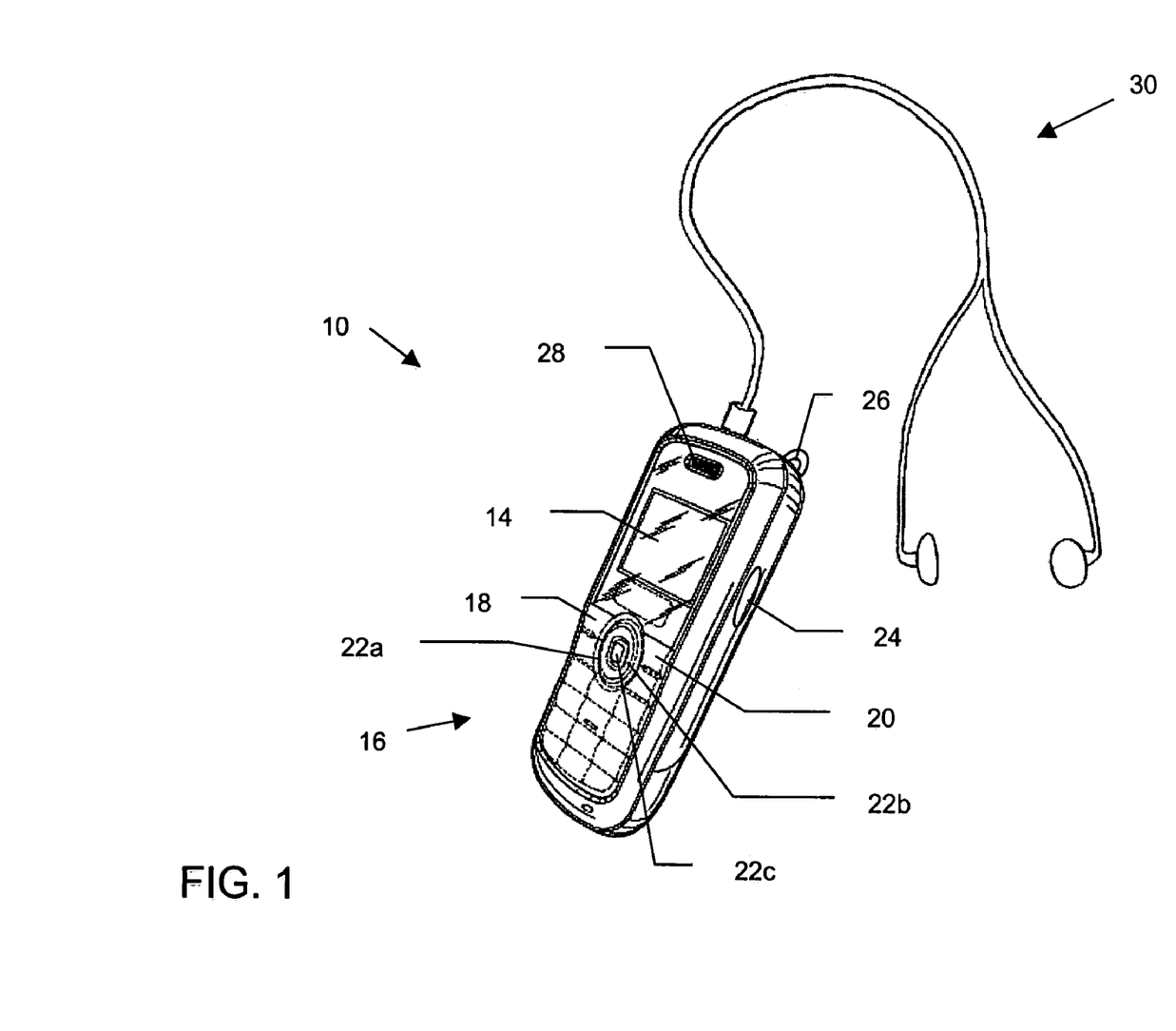
FIG. 1 is a schematic view of a mobile phone representing an exemplary electronic equipment in accordance with an embodiment of the present invention.

Referring initially to FIG. 1, an electronic equipment 10 is shown in accordance with the present invention. In the exemplary embodiment described herein, the electronic equipment is a mobile phone 10. The mobile phone 10 is shown as having a "brick" or "block" design type housing, but it will be appreciated that other type housings such as clamshell or slide-type housings may be utilized without departing from the scope of the invention.

The mobile phone 10 includes a display 14 and keypad 16. As is conventional, the display 14 displays information to a user such as operating state, time, phone numbers, contact information, various navigational menus, etc., which enable the user to utilize the various features of the mobile phone 10. Similarly, the keypad 16 may be conventional in that it provides for a variety of user input operations. For example, the keypad 16 typically includes alphanumeric keys for allowing entry of alphanumeric information such as telephone numbers, phone lists, contact information, notes, etc. In addition, the keypad 16 typically includes special function keys such as a "call send" key 18 for initiating or answering a call, and a "call end" key 20 for ending, or "hanging up" a call. Special function keys may also include menu navigation keys 22a, 22b and 22c, for example, for navigating through a menu displayed on the display 14 to select different phone functions, profiles, settings, etc., as is conventional. Other keys included in the keypad 16 may include a volume key 24, on/off power key 26, as well as various other keys such as a web browser launch key, camera key, etc.

In the particular embodiment of FIG. 1, the mobile phone 10 includes the display 14 and separate keypad 16. In an alternative embodiment, the display 14 may comprise a touchscreen which itself includes one or more keys. In yet another embodiment, the display 14 may comprise a touchscreen that includes all or substantially all of the keys used to operate the phone 10 so as to include a very limited keypad 16 or no keypad 16 at all As will be appreciated, the particular form and function of the keys included in the keypad 16 or touchscreen/display 14 are not germane to the invention in its broadest sense.

As will be described in more detail below, the mobile phone 10 is a multi-functional device that is capable of carrying out various functions in addition to traditional mobile phone functions. For example, the mobile phone 10 in accordance with the present invention also functions as a media player. More specifically, the mobile phone 10 is capable of playing different types of media objects such as audio files (e.g., MP3, .wma, AC-3), video files (e.g., MPEG, .wmv, etc.), still images (e.g., .pdf, JPEG, .bmp, etc.). The media objects are typically stored in non-volatile memory within the mobile phone 10. The mobile phone 10 reproduces audio files through a speaker 28 or an accessory such as stereo headphones 30 which may be plugged into the mobile phone 10 via an appropriate connector. The mobile phone 10 is capable of reproducing video or other image files on the display 14, for example.

For reasons that will be explained more fully below, the mobile phone 10 overcomes the aforementioned shortcomings associated with existing electronic equipment that offer media playback. The mobile phone 10 may include conventional shuffle mode operation which, when activated, randomizes the order in which media objects such as song files, video files, etc. are played back. In addition, however, the mobile phone 10 includes what may be referred to as "Shake 'n Shuffle™" technology. The technology overcomes the limitations of conventional shuffle mode operation in conventional electronic equipment. In particular, the mobile phone 10 includes a motion sensor. When a user desires to shuffle the order of playback of the media objects, the user simply shakes the mobile phone 10. The motion sensor detects the motion of the mobile phone 10, and automatically shuffles the order of playback of the media objects.

The "Shake 'n Shuffle™" technology allows a user to engage a shuffle feature without bothersome and time consuming navigation through the display 14, for example. Moreover, the "Shake 'n Shuffle™" technology enables a user to engage a shuffle feature easily even during playback without detracting from the user's entertainment experience.

In addition, the user is provided with some degree of control as to the extent to which the media objects are shuffled or randomized. For example, by shaking the mobile phone 10 for a relatively short time the user can command a limited amount of shuffle. By shaking the mobile phone 10 for a relatively long time, the user can command a more extensive amount of shuffle. Alternatively, the user can control the extent of shuffle by shaking the mobile phone relatively softly versus aggressively.

Figure 2:
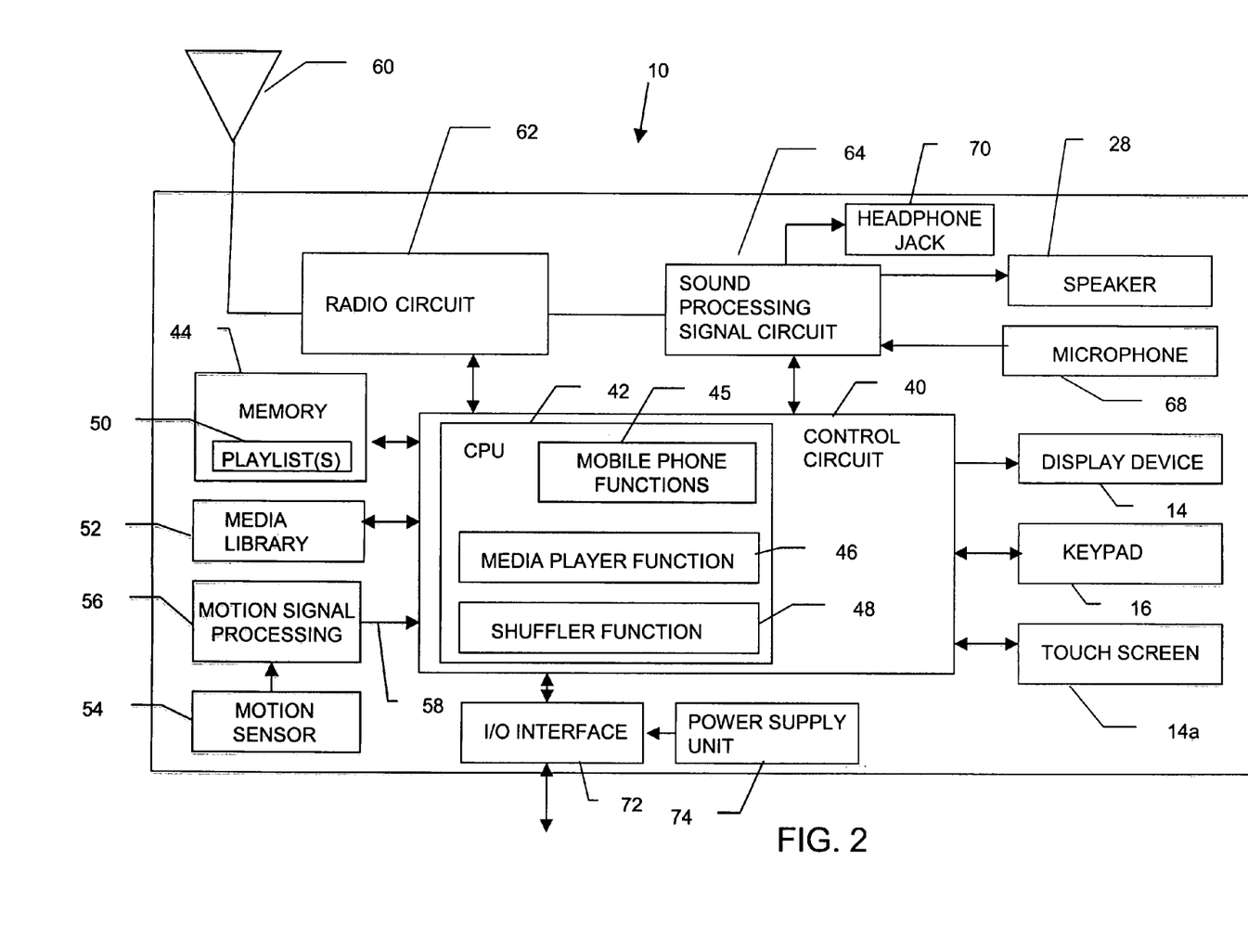
FIG. 2 is a schematic block diagram of the relevant portions of the mobile phone of FIG. 1 in accordance with an embodiment of the present invention.

FIG. 2 represents a functional block diagram of the mobile phone 10. The construction of the mobile phone 10 is generally conventional with the exception of media player with shuffle mode operation as described herein. Preferably, the media player with shuffle mode operation is implemented primarily via application software within the mobile phone 10. However, it will be apparent to those having ordinary skill in the art that such operation can be carried out via primarily software, hardware, firmware, or combinations thereof, without departing from the scope of the invention.

The mobile phone 10 includes a primary control circuit 40 that is configured to carry out overall, control of the functions and operations of the mobile phone 10. The control circuit 40 may include a CPU, microcontroller, or microprocessor, etc., collectively referred to herein simply as a CPU 42. The CPU 42 executes code stored in memory within the control circuit 40 (not shown) and/or in a separate memory 44 in order to carry out conventional operation of the mobile phone functions 45 within the mobile phone 10. In addition, however, the CPU 42 executes code stored in the memory 44 in accordance with the present invention in order to perform a media player function 46 and shuffler function 48. As is explained in more detail below with respect to FIGS. 3-10, the media player function 46 is used within the mobile phone 10 to play various media objects such as audio files, video files, picture/image files, etc. The shuffler function 48 is used in conjunction with the otherwise conventional media player function 46 to provide for shuffling of the media objects during playback as a result of the user shaking the mobile phone 10.

The memory 44 may include one or more playlists 50 created by the user or otherwise provided within the mobile phone 10. A playlist 50 identifies a list of media objects that the mobile phone 10 is to reproduce during playback. The media objects appear in the playlist in the order in which the media objects are intended to be reproduced normally (i.e., in the absence of a shuffle operation). The user may generate the playlists, or the user may download the playlist. Alternatively, the mobile phone may generate the playlist (e.g., based on a user input such as genre, artist, year of release, etc.), etc. In yet another alternative, playlist(s) may reside on remote storage, e.g., on a remote server accessible by the mobile phone 10 via a wireless internet connection. The particular manner in which the playlists are generated is not germane to the present invention, as will be appreciated.

The mobile phone 10 further includes a media library 52 in accordance with the preferred embodiment. The media library 52 represents a storage medium that stores various media objects in the form of audio files, video files, picture/image files, etc. The storage medium preferably is a non-volatile memory such as a large capacity flash memory or micro-hard drive, each of which are well known in personal media players. In a more limited context, the media library 52 may be represented by a relatively small capacity compact disk (CD), mini-disk, flash card, etc., each of which may be inserted into the electronic equipment for reproduction of the media objects thereon. Alternatively, media object(s) also may reside on remote storage. For example, the media objects may reside on a remote server also accessible by the mobile phone 10 via a wireless internet connection. The playlist(s) 50 each identify a list of media objects that are stored in the media library 52 and/or are accessible on remote storage. Typically a playlist will include only a subset of the media objects in the media library 52 or remote storage, although a playlist could include all of the media objects in the media library 52 or remote storage.

In accordance with conventional media player operation, the user will select a playlist 50 from among those in the memory 44 via a user interface typically in combination with the display 14. Alternatively, the user may request that the media player function 46 create a playlist 50 automatically (e.g., based on genre, artist, year of release, etc.). As yet another alternative, the media player function 46 will revert to a default playlist 50 in the absence of a specified selection by the user. Such a default playlist 50 may result from the order in which media objects are stored in the media library 52. For example, the media player function may revert to a default playlist where it plays the media objects stored in the media library 52 beginning at a starting address and sequentially therethrough to an ending address.

A user may initiate the media player function 46 via one or more keys on the mobile phone 10. Upon initiating playback, the media player function 46 looks to the selected (or default) playlist 50 and identifies the first media object in the list. Thereafter, the media player function 46 proceeds to reproduce the media object via the speaker 28/headset 30 and/or display 14. More particularly, the media player function 46 accesses the media object from the media library 52, and converts the digital data to an audio and/or video signal presented to the speaker 28/headset 30 and/or display 14. Upon completing the reproduction of the first media object in the playlist 50, the media player function then proceeds to reproduce the next media object in the playlist 50 in the same manner. This process continues until the media player function 46 reproduces the last media object in the playlist 50.

If the user requests conventional shuffle mode operation during playback of a playlist 50, the media player function 46 randomizes the order in which the media objects in the playlist 50 are reproduced. Typically this is done with the use of a pseudo-random generator within the media player function 46. The output of the pseudo-random generator serves to identify the next media object to be reproduced from the playlist, thus resulting in a randomized output. As noted above, however, conventional shuffle mode operation can be bothersome and time consuming in that it requires the user to navigate through the appropriate user interface screens to turn the shuffle feature on or off. Moreover, navigating through the user interface screens during playback itself can be disruptive to the listening and/or viewing experience of the user, thereby detracting from the overall entertainment experience. Thus, most users choose to either turn the shuffle feature on or off at the beginning of a playback session, and the feature remains on or off for the duration of the session. This too can detract from the overall entertainment experience.

Accordingly, the mobile phone 10 of the present invention further includes a motion sensor 54 as previously mentioned. The motion sensor 54 may be any type of motion sensor for detecting motion of the mobile phone 10 and producing a corresponding output. For example, the motion sensor 54 may be an accelerometer (e.g., single-axis or multiple-axis) which senses the acceleration of the mobile phone 10. Alternatively, the motion sensor 54 may be a simple mechanical device such as a mercury switch or pendulum type apparatus for sensing movement of the mobile phone 10. As will be appreciated, the particular type of motion sensor 54 is not germane to the invention.

The motion sensor 54 preferably resides within the housing of the mobile phone 10 along with the other circuitry represented in FIG. 2. However, it is not necessary that the motion sensor 54 reside within the housing. For example, the motion sensor 54 may be located outside the phone 10, e.g., attached to the headset 30 making up part of the overall mobile phone 10 or other electronic equipment. The motion sensor 54 preferably is made up of a simple, low-cost component such, as an accelerometer or a mechanical motion switch. On the other hand, the motion sensor may be more complex and rely on features of a built-in GPS system, ultrasonic/infrared radiators, etc., without departing from the scope of the invention.

The motion sensor 54 produces an output indicative of motion of the mobile phone 10. This output is provided to a motion signal processing section 56 that processes and conditions the signal prior to being input to the control circuit 40. Specifically, the motion signal processing section 56 provides a shuffle command signal to the control circuit 40 via line 58. The motion signal processing section 56 filters the output of the motion sensor 54 or otherwise conditions the output using known techniques such that the shuffle command signal is provided to the control circuit 40 only in instances where the user decidedly shakes the mobile phone 40 (e.g., back and forth. In other words, it is undesirable for a shuffle command to be provided to the control circuit 40 as a result of brief or casual movement of the mobile phone 10 (e.g., as a result of being dropped, carried by a user while walking or jogging, etc.). Therefore, the motion signal processing section 56 preferably requires that the output from the motion sensor 54 be maintained for at least a predetermined time and/or amplitude prior to issuing a shuffle command signal as will be appreciated.

A person having ordinary skill in the art of computer programming and specifically in applications programming for mobile phones and media players will consider it obvious in view of the description provided herein how to program a mobile phone 10 to operate and carry out the functions described herein. Accordingly, details as to the specific programming code have been left out for sake of brevity. Also, while the media player function 46 and shuffler function 48 are carried out via the CPU 42 and application software in the memory 44 in accordance with the preferred embodiment of the invention, such functions could also be carried out via dedicated hardware, firmware, software, or combinations thereof, without departing from the scope of the invention.

Continuing to refer to FIG. 2, the mobile phone 10 includes an antenna 60 coupled to a radio circuit 62. The radio circuit 62 includes a radio frequency transmitter and receiver for transmitting and receiving signals via the antenna 60 as is conventional. The mobile phone 10 further includes a sound processing circuit 64 for processing the audio signal transmitted by/received from the radio circuit 62. In addition, the sound processing circuit 64 serves to process the audio signal provided by the control circuit 40 during playback of media objects. Coupled to the sound processing circuit 64 are the aforementioned speaker 28, and a microphone 68 which enable a user to listen and speak via the mobile phone 10 as is conventional. In addition, a headphone jack 70 coupled to the sound processing circuit 64 is provided. This allows the headset 30 to be connected to the mobile phone 10. Thus, when functioning as a media player the mobile phone 10 may direct audio to the speaker 28 and/or the headset 30 via the sound signal processing circuit 64. The radio circuit 62 and sound processing circuit 64 are each coupled to the control circuit 40 so as to carry out overall operation.

The mobile phone 10 also includes the aforementioned display 14 and keypad 16 coupled to the control circuit 40. In the case where all or part of the display 14 comprises a touchscreen, such operation may be represented by the touchscreen 14a in FIG. 2. The mobile phone 10 further includes an I/O interface 72. The I/O interface 72 may be in the form of any one of many typical mobile phone I/O interfaces, such as a multi-element connector at the base of the mobile phone 10. As is typical, the I/O interface 72 may be used to couple the mobile phone 10 to a battery charger to charge a power supply unit 74 within the mobile phone 10. In addition, or in the alternative, the I/O interface 72 may serve to connect the mobile phone 10 to a wired personal hands-free adaptor (not shown) or Bluetooth adaptor (also not shown) for use with a Bluetooth-based hands-free adaptor. Further, the I/O interface 72 may serve to connect the mobile phone 10 to a personal computer or other device via a data cable, etc. As another alternative, the I/O interface 72 may serve to connect the mobile phone 10 to a docking station including an audio amplifier, speakers and/or video display to allow for enhanced viewing/listening of the media objects as part of the media player function.

Figure 3A:
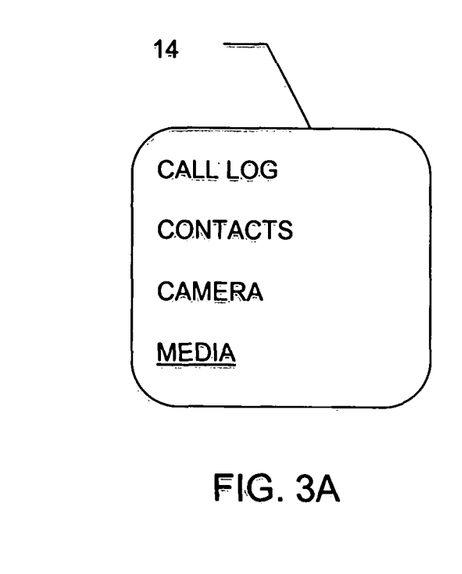
FIGS. 3A, 3B, 3C and 3D illustrate exemplary graphical user interface screen displays on the mobile phone of FIG. 1 in accordance with an embodiment of the present invention.
Figure 3B:
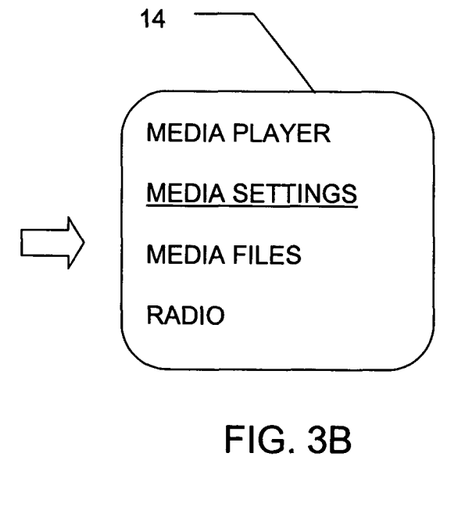
Figure 3C:
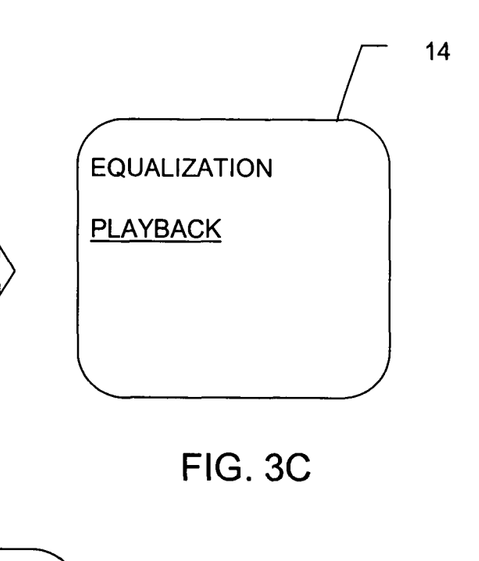
Figure 3D:
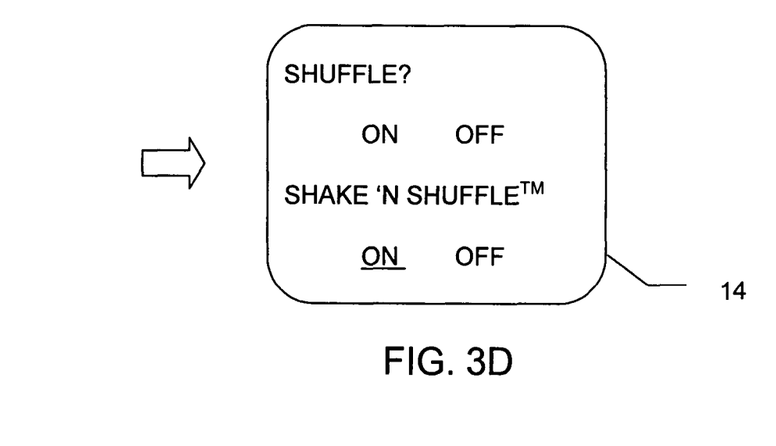
Figure 4:
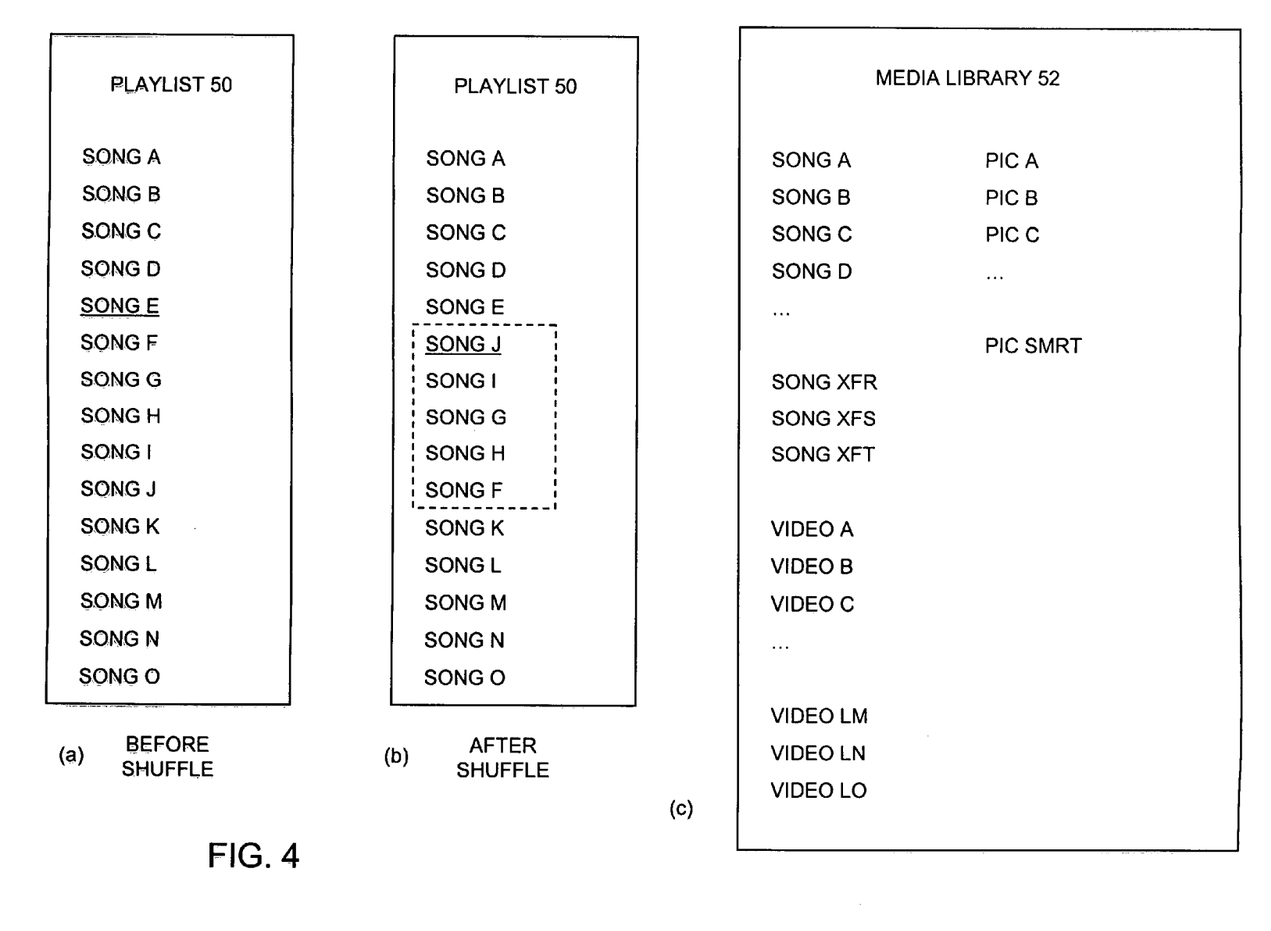
FIGS. 4(a), 4(b) and 4(c) represent graphically an exemplary media library, a playlist prior to shuffle, and the playlist after shuffle in accordance with an embodiment of the present invention.
Figure 5:
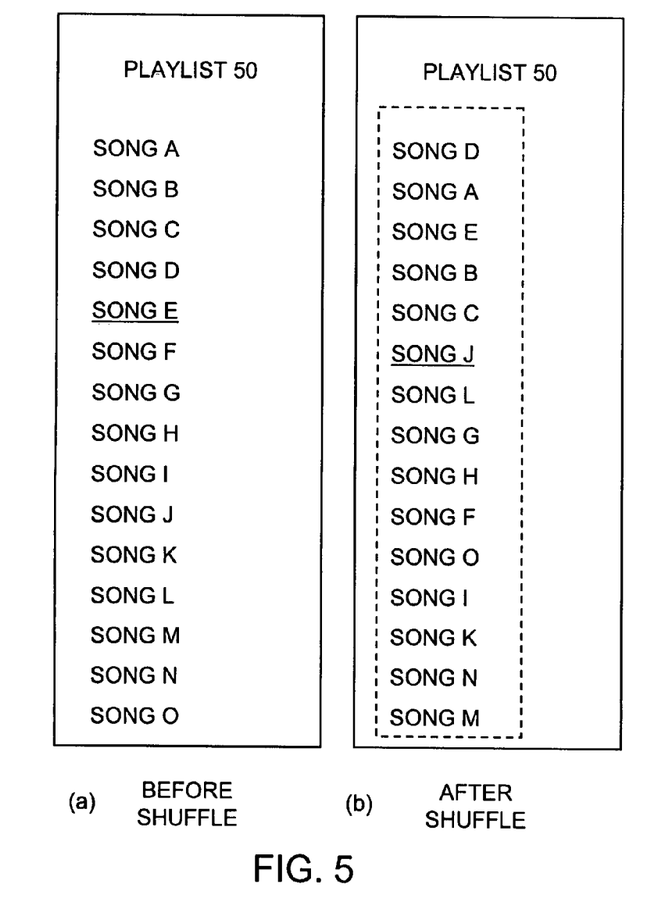
FIGS. 5(a) and 5(b) represent graphically an exemplary playlist prior to shuffle, and the playlist after shuffle in accordance with another embodiment of the present invention.
Figure 6:
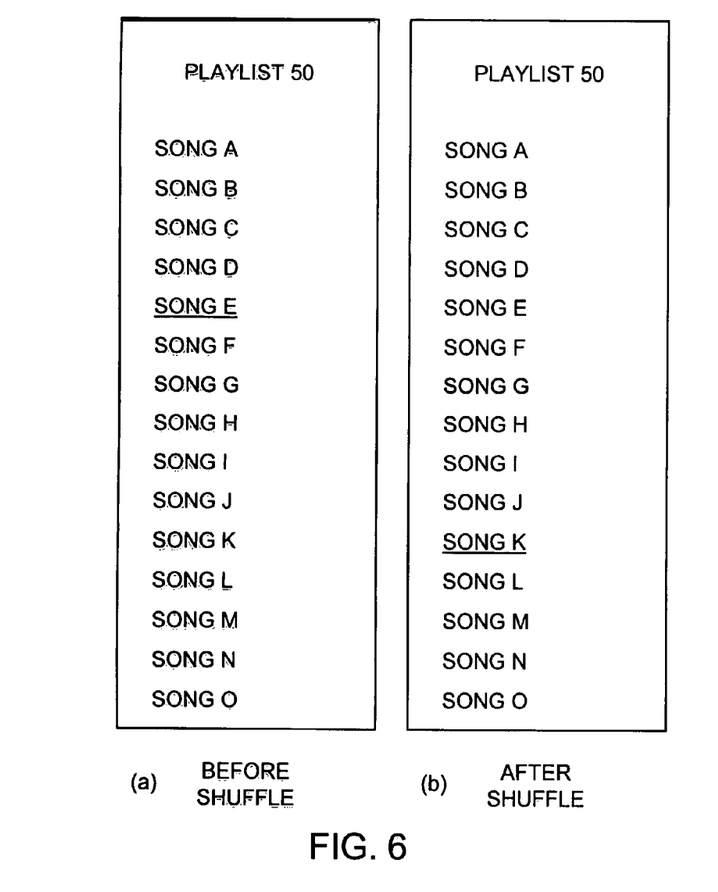
FIGS. 6(a) and 6(b) represent graphically an exemplary playlist prior to shuffle, and the playlist after shuffle in accordance with another embodiment of the present invention.
Figure 7:
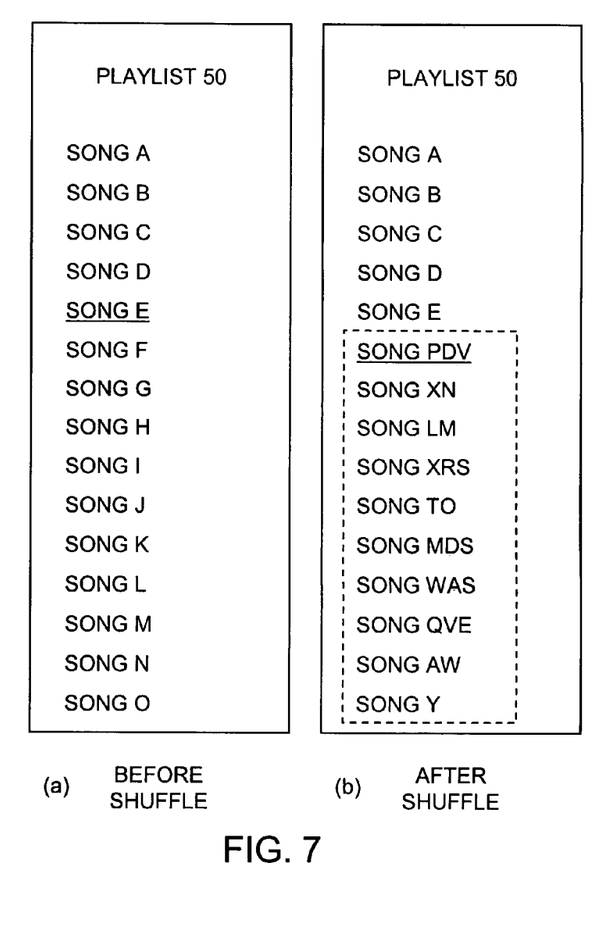
FIGS. 7(a) and 7(b) represent graphically an exemplary playlist prior to shuffle, and the playlist after shuffle in accordance with still another embodiment of the present invention.

Turning now to FIGS. 3A-3D, exemplary screen displays are shown illustrating a manner in which a user may initiate the Shake 'n Shuffle™ features of the present invention. Using the navigation keys 22a, 22b and 22c on the keypad 16, for example, the user may call up a main menu on the display 14 as shown in FIG. 3A. By manipulating the navigation keys, the user may select "Media" leading to the sub-menu shown in FIG. 3B. Again, by manipulating the navigation keys the user may then select "Media Settings" resulting in the sub-menu shown in FIG. 3C. By selecting "Playback" in the menu of FIG. 3C, the user may thereby initiate the features of the present invention. Specifically, the user may select in the menu of FIG. 3D whether the Shake 'n Shuffle™ shuffler function processing is "On" or "Off. By selecting either "On" or " Off, the user controls how the mobile phone 10 functions with respect to media playback as will now be described in detail with respect to FIGS. 4-7 and 10.

Referring to FIGS. 4(a) and 4(b), an exemplary playlist 50 is shown prior to and subsequent to, respectively, a shuffle command via the motion sensor 54 and motion signal processing section 56. FIG. 4(c) illustrates and exemplary media library 52. As is shown in FIG. 4(c), the media library 52 may include a wide variety of media objects in the form of audio files (e.g., Song A thru Song XFT), video files (e.g., Video A thru Video LO), picture/image files (e.g., PIC A thru PIC SMRT). The playlist 50, as shown in FIG. 4(a), includes a subset of the songs within the media library 52. In this particular example, the playlist 50 includes, in order, Song A thru Song O. It will be appreciated that in another embodiment, the playlist 50 may include audio files, video files, picture/image files, etc., or any combination thereof, without departing from the scope of the invention.

FIG. 4(a) illustrates Song E as being highlighted. Such highlight convention is intended to indicate the current media object being played by the media player function 46 within the playlist 50. Thus, FIG. 4(a) is meant to illustrate Song E being reproduced immediately prior to a shuffle command.

Next, assume a user of the mobile phone 10 proceeds to shake the mobile phone 10 with his or her hand, such as with a dice shaking motion. The motion sensor 54 detects such motion and the motion signal processing section 56 processes the output of the motion sensor 54 to output a shuffle command signal to the control circuit 40. As will be described in more detail below with respect to FIGS. 8 and 9, the motion signal processing section 56 may be capable of outputting a shuffle command signal indicative of different degrees to which the mobile phone 10 has been shaken by the user. The different degrees may be used to define the type of shuffle, the extent of shuffle, etc. The different degrees may be used indirectly in the randomization, e.g., by defining the type or extent handled by an otherwise conventional pseudo-random generator. Still further, the different degrees may be used directly in the randomization, e.g., by providing a seed value to the otherwise conventional pseudo-random generator. The present invention in its broadest sense covers any and all use of different degrees.

In the example of FIG. 4(b), it is assumed that the user has shaken the mobile phone 10 to a lesser degree rather than a greater degree. In accordance with the present invention, the shuffler function 48 responds by shuffling the contents of the playlist only in a localized manner with respect to Song E which had currently been playing. In other words, the shuffler function 48 alters the order of the playlist only with respect to those songs that are in near proximity of Song E. Thus, FIG. 4(b) illustrates how the shuffler function 48 alters the order of an arbitrary number of songs (e.g., five in the example of FIG. 4(b)) in near proximity to Song E. As a result, Songs F thru J are shuffled, whereas Songs K thru O remain in their original order. In the exemplary embodiment, the media player function 46 begins with the next song in the playlist following the shuffle, e.g., Song J. The actual randomizing of the songs can be done using conventional shuffle techniques such as a pseudo-random generator, as will be appreciated. In this case, however, the randomizing is limited to only those songs that are local to the song being currently played.

Also, it will be appreciated that although the playlist 50 is shown herein after a shuffle command as containing the songs in altered order, this is merely meant to represent the altered order in which the objects in the media list will be played. Depending on the type of media player function 46 and shuffler function 48, the shuffler function 48 may literally alter the order of the listing of the objects in the playlist 50. More typically, however, the objects in the playlist 50 will remain in their original order as represented in FIG. 4(a). The shuffler function 48 will alter the order of the objects in the manner represented in FIG. 4(b) by randomizing the location of a pointer which is calculated to point to the next media object in the playlist, as will be appreciated. The present invention is not intended to be limited to any particular form of randomizing, and does not require that the order of the contents of a playlist itself literally be altered. Rather, the present invention is concerned with the randomizing or shuffling of the order in which the contents are reproduced relative to the original playlist.

FIGS. 5(a) and 5(b) illustrate another example of the shuffling of the playlist 50 in response to a shuffle command signal. FIG. 5(a) illustrates a playlist identical to the playlist of FIG. 4(a). Again, it is shown that the song being played immediately prior to the shuffle is Song E. In this example, however, assume a user shakes the mobile phone 10 to a greater degree rather than a lesser degree. The motion signal processing section 56 issues a shuffle command signal on line 58 to the control circuit 40 indicative of the greater degree of shaking. In response, the shuffler function 48 proceeds to shuffle the order of the songs throughout the playlist 50 as represented in FIG. 5(b) (or in some other predefined manner different from when the mobile phone 10 is shaken to a lesser degree) Thus, the media player function 46 following the shuffle proceeds to play Song J., followed by Songs L, G, H, F, O, . . . , etc. Again, the shuffler function 48 may use conventional shuffle techniques, such as a pseudo-random generator, to randomize the order of the media objects in the playlist 50.

It is noted that the order of Songs A thru E in the playlist 50 of FIG. 5(b) is also altered, despite these songs having already been played at the time of the shuffle command. Moreover, Songs A thru E remain above the currently played Song J following the shuffle command. Songs A thru E in such case would preferably remain above the currently played Song J in the playlist because even in shuffle mode users typically prefer to hear songs in a playlist that they have not yet heard before hearing songs repeated. On the other hand, should the user request that the playlist be repeated upon the playing of the last song in the playlist 50, Songs A thru E are now shuffled to alter the original order in which they were heard.

Consequently, it will be appreciated that the particular form of shuffling which is implemented is not necessarily limited in the invention in it's broadest sense.

FIGS. 6(a) and 6(b) illustrate another example of the type of shuffling which may be implemented by the shuffler function 48 in response to a shuffle command signal from the motion signal processing section 56. FIG. 6(a) represents a playlist 50 prior to a shuffle command similar to FIGS. 4(a) and 5(a). Again it is assumed that the song being played immediately prior to the shuffle command is Song E as shown in FIG. 6(a). Shaking of the mobile phone 10 by the user is detected by the motion sensor 54, resulting in a shuffle command signal being issued to the control circuit 40. In response, the shuffler function 40 causes the order of the songs reproduced to be "shuffled" in the sense that the current song being played is changed randomly to another song further down in the list. Thus, as is represented in FIG. 6(b), the current song being played changes from Song E to Song K as a result of the shuffle operation. In an alternative embodiment, the shuffler function 48 may be programmed to change randomly from the current song to a song within X number of songs of the current song prior to the shuffle in the case of a first degree of shake, and to a song within Y number of songs of the current song prior to the shuffle in the case of a second degree of shake, greater than the first degree, where Y is greater than X.

FIGS. 7(a) and 7(b) represent yet another example of the type of shuffling which may be carried out in accordance with the present invention. In this example, rather than simply alter the order in which the media objects are played from the playlist 50, the shuffler function 48 alters the content of the playlist 50. For example, FIG. 7(b) illustrates how in response to a shuffle command signal from the motion signal processing section 56, the shuffler function 48 alters the content of the playlist following current song E. The shuffler function 48 may be programmed to alter the content simply by drawing from the contents of the media library 52. The actual objects chosen from the media library 52 can be determined randomly or according to some predefined pattern as will be appreciated.

FIG. 7(b) illustrates a case where the contents of the playlist 50 are completely replaced following shaking of the mobile phone 10 by the user. This may represent the response in the case where the mobile phone 10 is shaken to one extent (e.g., vigorous shaking). In a case where the mobile phone 10 is shaken to another extent (e.g., less vigorous shaking), the shuffler function 48 may be programmed to alter the content of the playlist to a lesser extent (e.g., in only a localized region near the current song as in the example of FIGS. 4(a) and 4(b)).

It will be appreciated that the various features of the different embodiments discussed herein can be mixed and matched and further represent examples of the present invention. For instance, the shuffle command signal in another embodiment in relation to FIG. 7(b) could also be designed to shuffle Songs A thru E prior to the current song in the playlist 50. For example, these songs also could be randomized as were Songs A thru E in the embodiment of FIG. 5(b) for the same reasons discussed above. Alternatively, Songs A thru E could be altered in the sense of replaced with other songs just as in the case of Songs F thru O in the example of FIG. 7(b).

Figure 8:
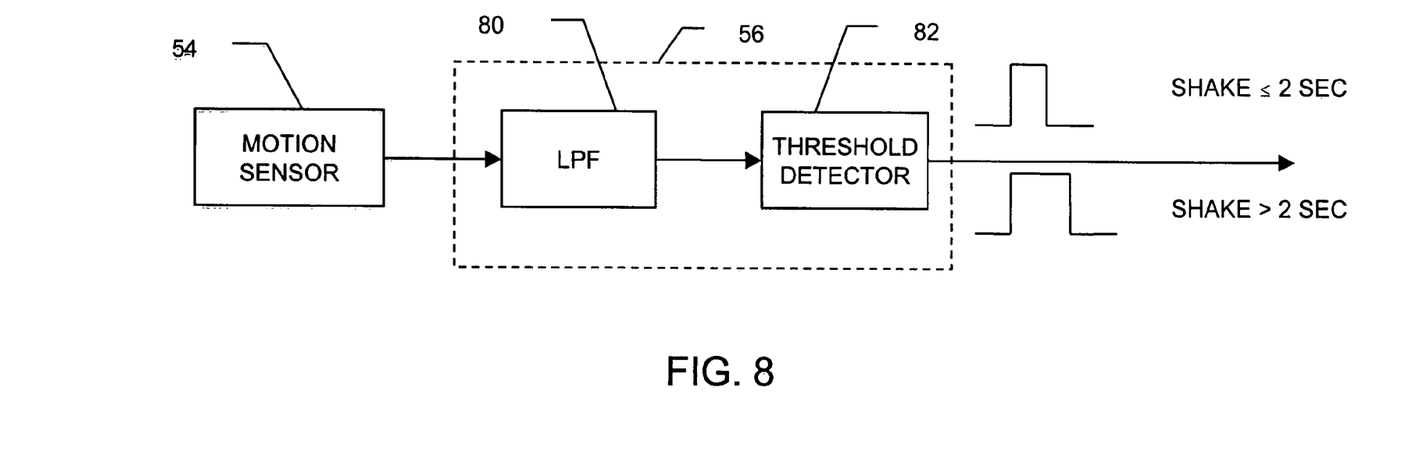
FIG. 8 is a schematic block diagram of a motion signal processor in accordance with an embodiment of the present invention.
Figure 9:
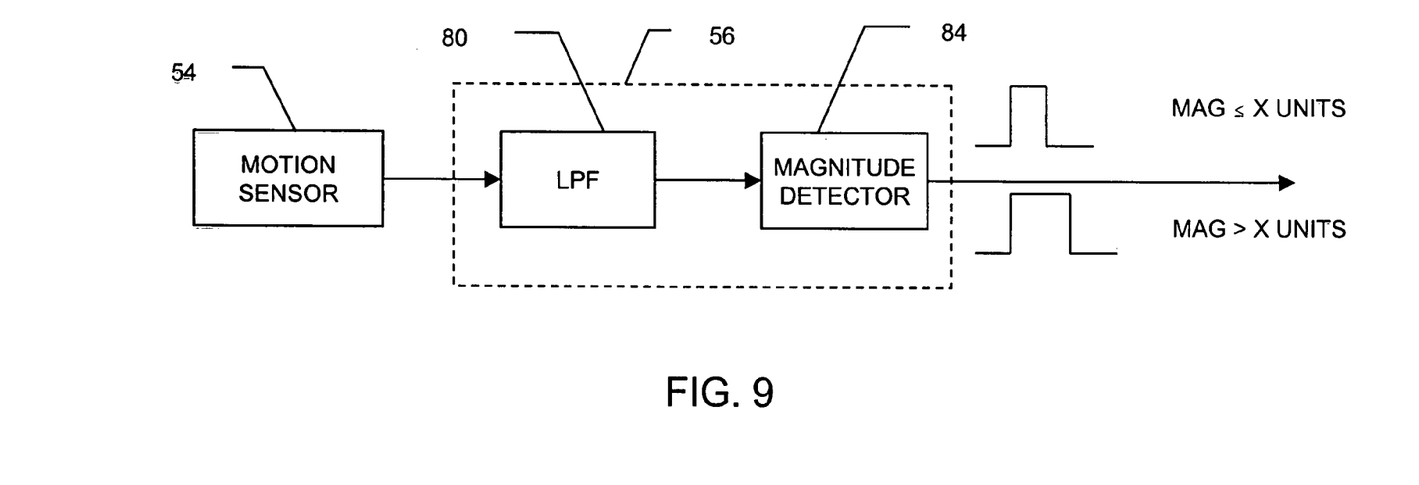
FIG. 9 is a schematic block diagram of a motion signal processor in accordance with another embodiment of the present invention.

Referring now to FIGS. 8 and 9, two different examples of the motion signal processing section 56 are shown for providing a shuffle command signal representing different degrees of shaking by the user. In the embodiment of FIG. 8, the output from the motion sensor 54 is provided to a low pass filter 80 which filters the signal to remove any noise or spurious signals resulting from brief, unintended movement of the mobile phone 10, or casual movement of the mobile phone 10. The filtered output is input to a threshold detector 82. The threshold detector 82 is designed to output a shuffle command signal having a first pulsewidth in the event the output of the LPF 80 represents shaking by the user of less than or equal to a predefined time (e.g., 2 seconds). Moreover, the threshold detector 82 is designed to output a shuffle command signal having a second pulsewidth, greater than the first, in the event the output of the LPF 80 represents shaking by the user of more than a predefined time. In this manner, the shuffle command signal is indicative of the degree to which the mobile phone 10 is shaken (e.g., shaken equal to or less than 2 seconds vs. shaken more than 2 seconds).

While the example of FIG. 8 determines degree based on time shaken, other criteria may be used. For example, FIG. 9 illustrates how a magnitude detector 84 may be substituted in place of the threshold detector 82. Specifically, the magnitude detector 84 is designed to output a shuffle command signal having a first pulsewidth in the event the output of the LPF 80 has a magnitude which is less than or equal to a predefined value X. The magnitude detector 84 is further designed to output a shuffle command signal having a second pulsewidth, greater than the first, in the event the output of the LPF 80 has a magnitude that is greater than a predetermined value X. The value of X is selected such that a value equal to or below X is indicative of moderate shaking of the mobile phone 10 by the user, whereas a value greater than X is indicative of more aggressive or vigorous shaking of the mobile phone 10 by the user. Other criteria may include, for example, degrees based on the particular axis upon which the mobile phone 10 is shaken in the case of a multiple axis motion sensor 54.

Figure 10:
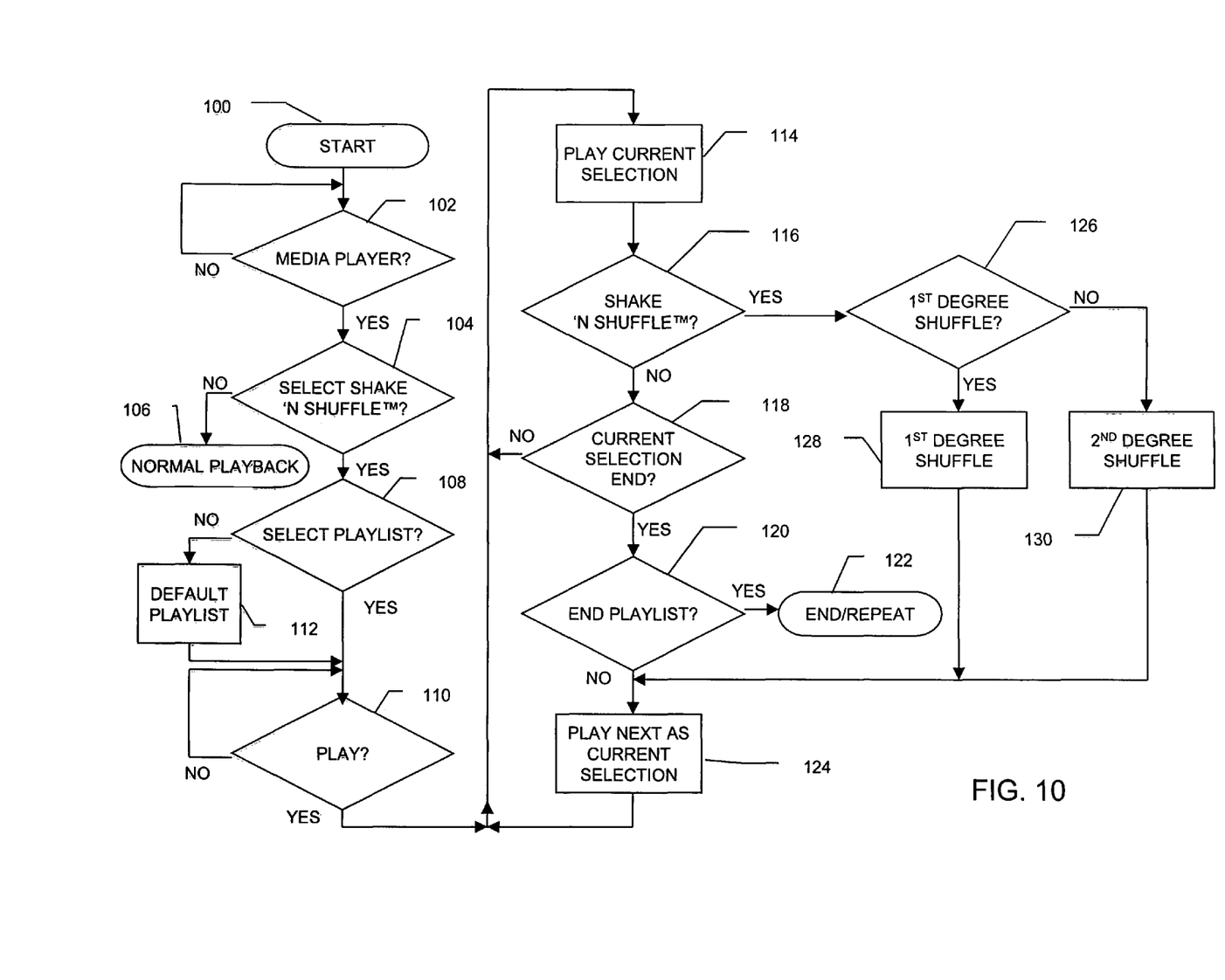
FIG. 10 is a flowchart representing the relevant operation of the electronic apparatus of FIG. 1 in accordance with an embodiment of the present invention.

Referring now to FIG. 10, a flowchart is shown that illustrates the operation of the mobile phone 10 with respect to the Shake 'n Shuffle™ in accordance with the present invention. Operation begins in Step 100 where the mobile phone 10 has been turned on, e.g., via the power on/off key 28 (FIG. 1). Next, in Step 102 the control circuit 40 determines if the mobile phone 10 is in media player mode. The mobile phone 10 may have been placed in the media player mode as a result of user selection via the navigation keys and display, or any other predesignated manner as will be appreciated. If the mobile phone 10 has not been placed in the media player mode, the mobile phone 10 will continue to loop through Step 102 as shown in FIG. 10.

If the mobile phone 10 is in the media player mode as determined in Step 102, the mobile phone 10 proceeds to Step 104. In Step 104, the control circuit 40 determines if the mobile phone 10 has been placed in the shake-based shuffle mode as described herein. The mobile phone 10 may have been placed in the shake-based shuffle mode in the manner described above in relation to FIGS. 3A thru 3D, or any other manner as will be appreciated. In the event the shake-based shuffle mode has not been selected as determined in Step 104, the mobile phone 10 proceeds to Step 106 in which normal playback is carried out without the features of the invention.

On the other hand, if the user selects shake-based shuffle operation in accordance with the present invention as determined in Step 104, the mobile phone 10 proceeds to Step 108. In Step 108, the control circuit 40 determines if the user has selected a playlist among the playlists 50 in memory 44. The user may select the playlist 50 in any known manner, including via the navigation keys and display 14 as is typical. If the user has selected a playlist as determined in Step 108, the mobile phone 10 proceeds to Step 110. If the user has not selected a playlist as determined in Step 108, the mobile phone 10 proceeds to Step 112 where the control circuit 40 reverts to a default playlist as described herein. Thereafter, the mobile phone 10 proceeds to Step 110 as shown.

In Step 110, the control circuit 40 determines if the user has selected the play function of the media player, whereby the media player function 46 is to begin playing the media objects in the playlist 50 from Step 108 or Step 112. The user may select the play function using any conventional technique, typically by pressing a corresponding key on the mobile phone 10. If the user has not selected the play function in Step 110, the control circuit 40 will simply loop around Step 110 as shown. On the other hand, upon the user selecting the play function, the mobile phone 10 proceeds from Step 110 to Step 114.

In Step 114, the control circuit 40 causes the media player function 46 to begin playing the current selection in the playlist 50. If it is the first time the user selected the play function in relation to the selected playlist 50, the current selection following Step 110 will typically be the first media object included in the playlist 50. On the other hand, if the user was previously using the media player function 46 and chose to pause or stop play, the current selection in Step 114 would typically be the media object that was currently being reproduced when the user chose to pause or stop play. For sake of explanation, the current selection in Step 114 following Step 110 is assumed to be the first media object included in the playlist 50.

Following Step 114, the mobile phone 10 proceeds to Step 116 in which the control circuit 40 determines if a shuffle command has been received via the motion signal processing circuit 56. As described above, such a shuffle command signal would be a result of the user shaking the mobile phone 10 and the motion sensor 54 detecting such shaking. In the event a shuffle command has not been received as determined in Step 116, the mobile phone 10 proceeds to step 118 where the control circuit 40 determines if the media player function 46 has completed playing the current selection. If the current selection has not been completed, the mobile phone 10 continues to loop from Step 118 back to Step 114 where the media player function 46 continues to play the current selection, to Step 116 where the control circuit 40 determines if a shuffle command signal has been received, and back to Step 118, assuming a shuffle command signal has not been received.

If in Step 118 the control circuit 40 determines that the media player function 46 has completed playing of the current selection, the mobile phone 10 proceeds to Step 120. It is in Step 120 that the control circuit 40 determines whether the media player function 46 has reached the end of the playlist 50. If yes, the play operation is complete and the mobile phone proceeds to Step 122 where the play function is automatically stopped. Alternatively, if the user has selected for the playlist to be repeated as is common, the above-described operation beginning with Step 114 can be repeated starting with the first media object in the playlist.

On the other hand, if the media player function 46 has not reached the end of the playlist 50 as determined in Step 120, the mobile phone 10 proceeds to Step 124. The control circuit 40 in Step 124 causes the media player function 46 to begin to play the next media object in the playlist 50 as the new current selection. Thereafter, the mobile phone 10 returns to Step 114 and the above-described process is repeated.

Referring back to Step 116, in the event the control circuit 40 does detect a shuffle command signal during the playback of the current selection, the mobile phone 10 proceeds to Step 126 as shown. In Step 126, the control circuit 40 determines if the shuffle command signal represents a first degree of shuffle. Such determination may be based on the pulsewidth of the shuffle command signal as in the embodiments of FIG. 8 or 9, or by some other manner as will be appreciated. If the shuffle command signal represents a first degree of shuffle as determined in Step 126, the mobile phone 10 continues to Step 128 in which the particular type of shuffle associated with the first degree is carried out by the shuffler function 48. If the shuffle command signal does not represent a first degree of shuffle as determined in Step 126, it can be assumed in this herein described two-degree embodiment that the shuffle command signal represents the second degree of shuffle. Thus, the mobile phone proceeds to Step 130 and the particular type of shuffle associated with the second degree is carried out by the shuffler function 48. Following both Steps 128 and 130, the mobile phone 10 proceeds to Step 124 and the above-described procedure is continued. In this case, however, the order of playback and/or content of the playlist 50 will have been altered as exemplified above.

The particular types of shuffle carried out in accordance with a first degree and a second degree as described above can be any type. The above description provides examples of different types, but the present invention is not intended to be limited to only those examples described herein. Further, although the examples described herein include first and second degrees of shake and control based thereon, the present invention includes any number of degrees. All that is needed is to provide an appropriate motion signal processing circuit 56 as will be readily appreciated by those having ordinary skill in the art based on the disclosure herein. Still further, it will be appreciated that the present invention does not require the detection of different degrees of shake in it's broadest sense. The inventive concepts apply fundamentally to the simple detection of shaking, based upon which the order and/or content of playback from a playlist may be altered.

In view of the above description, it will be appreciated that the present invention provides for electronic equipment with media playback that do not suffer from the drawbacks of conventional media playback devices. More particularly, the present invention provides for electronic equipment that allows a user to engage a shuffle feature without bothersome and time consuming navigation. A user may engage a shuffle feature simply by shaking the electronic equipment, even during listening and/or viewing without detracting from the user's entertainment experience. Moreover, the user is provided with a degree of control as to the extent to which the items in a playlist are shuffled or randomized.

It should be appreciated that the term "playlist" as referred to herein represents a list of media objects intended for playback. The order in which the media objects appear in the list is indicative of the order in which the media objects are to be played. The playlist may be an actual entity (typically a digital file) within an electronic equipment. Alternatively, and particularly in the case of a default playlist in an electronic equipment, the playlist may be represented circumstantially based on the manner in which the media objects are normally reproduced. For example, the playlist may represent the media objects and the order the electronic equipment would reproduce the media objects during conventional operation. More specifically, an electronic equipment may simply began playing media objects one after another starting at a beginning address of a recording medium and the media object stored thereat (e.g., the first track of a CD) and proceeding sequentially through the media objects in the order they are stored in the recording medium (e.g., tracks 2, 3, 4, etc. of a CD). As another alternative, a playlist may be represented by a table of contents of a storage medium stored as part of data management information in the electronic equipment. A "playlist", in the context of the present invention, refers to the media objects that would normally be reproduced by the electronic equipment, and the order in which the media objects would normally be played, if a shuffle feature was not activated. Altering of the playlist refers to the order in which the shuffled media objects would be played, which is different from the order in which the media objects would be played if the shuffle feature was not activated.

Although the result of a shuffle operation within a playlist is represented herein predominantly graphically by a change in the displayed order and/or content of the playlist, those having ordinary skill in the art will appreciate that a playlist itself need not necessarily be altered. For example, the electronic equipment may be designed to use a pointer to point to the address of a particular media object within the playlist to be played. In normal sequential playback, the pointer simply points to the address of the next media object in the sequence of the playlist. In shuffle mode, on the other hand, a random or pseudo-random generator is used to cause the pointer to move randomly to a next media object in the playlist to be played. The present invention is intended to cover any and all such types of shuffle operation. The change in the displayed order of the playlist as illustrated herein is simply intended to facilitate ease of understanding.

Figure 11:
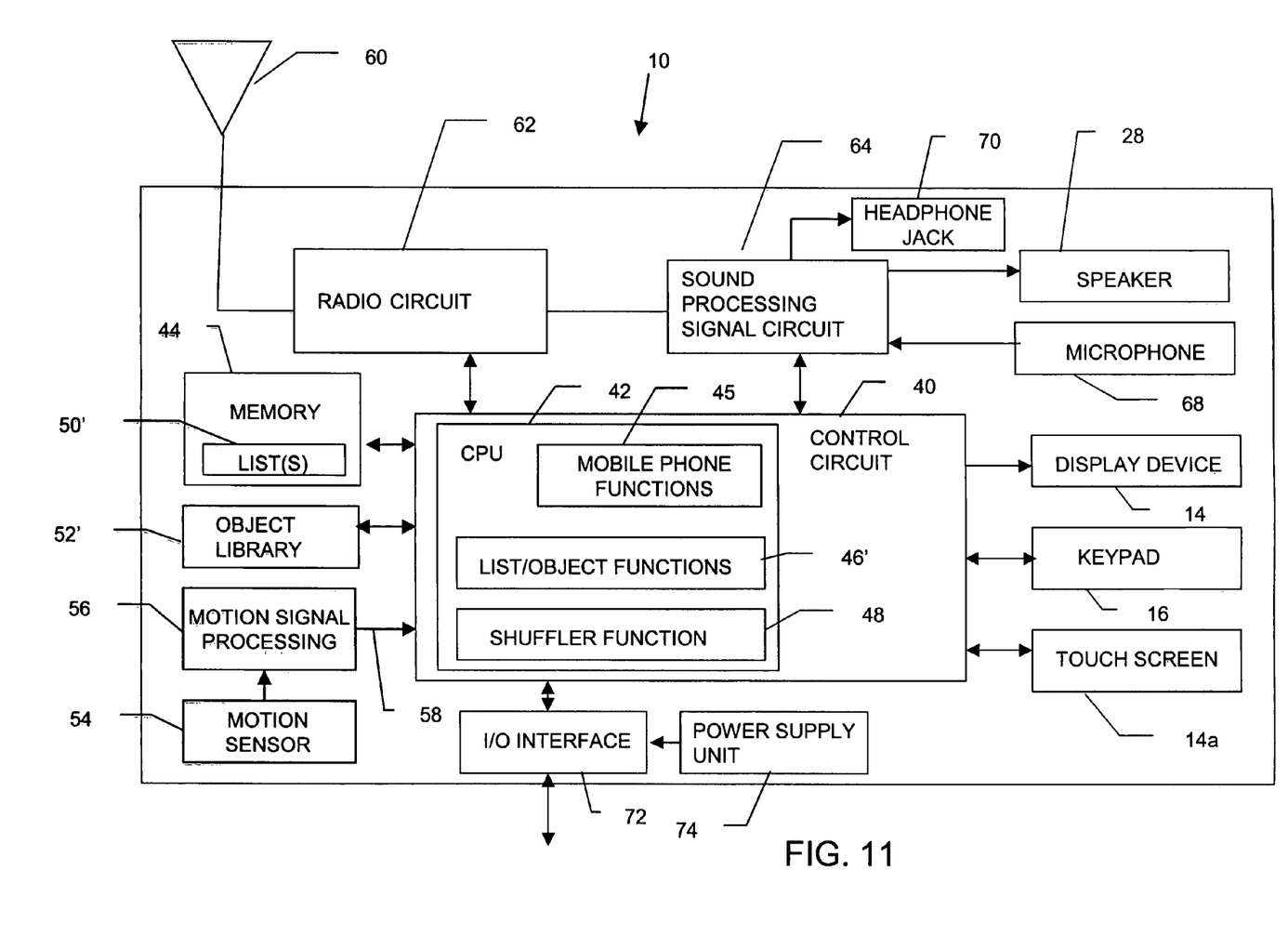
FIG. 11 is a schematic view of a mobile phone representing an exemplary electronic equipment in accordance with another embodiment of the present invention.

Furthermore, the principals of the invention are applicable to shuffle operation within any type of electronic equipment, and are not necessarily limited to shuffle operation in media playback. For example, FIG. 11 illustrates a mobile phone 10 similar to the example in FIG. 1; however, the phone 10 does not necessarily include media player function and lists of media objects. Instead, the mobile phone 10 is shown more generally as including list/object related functions 46', lists 50' and/or an object library 52'. The particular functions and how the functions relate to the objects or lists of objects can be in relation to virtually any user related function.

For example, instead of the objects in a list being media files as discussed above, the objects could be the different possible theme settings (e.g., colors, fonts, icons, sounds, backgrounds, etc.) relating to the user interface (e.g., display 14, speaker 28, etc.) of the phone 10. The user shakes the mobile phone 10 in the same manner described above, but in this example the shuffler function randomizes the theme settings of the phone to generate a new selection of colors, fonts, icons, etc., which are provided to the user as the theme of the device. Thus, simply by shaking the phone 10 the user is presented with a randomly generated theme, thereby adding to the user's entertainment experience.

In the case where the electronic equipment is a game, the shuffle operation can be used as a part of the game. For example, the mobile phone 10 may include a card game function among the list/object related functions 46'. Rather than the user pressing a "deal" button as is conventional in electronic card, the user shakes the mobile phone 10. The motion sensor 54 senses the motion, and the motion signal processing 56 prompts the shuffler function to randomly alter the cards (representing an assemblage of objects) displayed on the display device 14. The shuffle operation is not limited to card games, but any type of game where the user may desire to alter the order or content of what is presented on the display 14. The randomization itself in all of the above-described examples can be carried out simply via a pseudo-random generator within the control circuit 40, and particularly the shuffler function 48, as will be appreciated.

Furthermore, there may be instances where a shuffle operation based on casual movement of the user may be desirable. For example, a user who is out jogging or walking may desire a more continuous form of randomization in association with the movement of the electronic equipment as a result of walking or jogging. In such case, the motion sensor 54 and motion signal processing 56 can be readily adapted to provide a shuffle command signal within each significant motion of a user during walking or jogging. Alternatively, the motion sensor 54 and motion signal processing 56 may be configured to include an adjustable timer so that the user may choose how frequently a shuffle command signal may be valid.

Still further, while the objects with respect to media players are described above primarily as media objects in the form of audio files, video files, image files, etc., the objects of the shuffle operation may be other media related objects. For example, a playlist 50 may be made up of objects whereby the objects themselves represent individual playlists. By shaking the mobile phone 10, the shuffle command signal causes an altering of the order of the individual playlists within the playlist 50, and/or causes an altering of the individual playlists that make up the playlist 50.

In still another example, shaking of the mobile phone 10 may be used to randomize the rules of a smart playlist. For example, shaking can be used to randomize criteria that form an automated "smart" playlist such as genre and recency. Thus, for example, shaking can result in a shuffle command signal that alters the criteria associated with a smart playlist so that a user ends up hearing a list of all rock music not listened to recently. As a result of a further shake, the user may get a smart playlist made up of most favorite songs from a given year, etc.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. An electronic equipment, comprising: access to a playlist, the content of which identifies a plurality of media objects to be played in a predetermined order; a media player section configured to play the plurality of media objects identified in the playlist in the predetermined order; a shuffler section for altering the content of the playlist; and a motion sensor that detects motion of the electronic equipment, the motion sensor producing an output based on detected motion from which the shuffle command is derived; wherein the shuffler section alters the content of the playlist in response to the shuffle command; and wherein the electronic equipment includes a library of media objects, the plurality of media objects identified in the playlist represent a subset of the media objects within the library, and the shuffler section alters the content of the playlist by at least one of adding additional media objects from the library to the playlist, or substituting additional media objects from the library for all or part of the plurality of media objects already identified in the playlist.

* * * * *